United States Patent
Tajima et al.

(10) Patent No.: US 10,252,442 B2
(45) Date of Patent: Apr. 9, 2019

(54) METHOD FOR MANUFACTURING CERAMIC FORMED BODY, AND APPARATUS FOR MANUFACTURING CERAMIC FORMED BODY

(71) Applicant: NGK INSULATORS, LTD., Nagoya (JP)

(72) Inventors: Yuichi Tajima, Nagoya (JP); Kensuke Okumura, Nagoya (JP); Seiichiro Hayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 119 days.

(21) Appl. No.: 15/080,873

(22) Filed: Mar. 25, 2016

(65) Prior Publication Data

US 2016/0288367 A1 Oct. 6, 2016

(30) Foreign Application Priority Data

Mar. 31, 2015 (JP) .................................. 2015-074107
Jan. 6, 2016 (JP) .................................. 2016-001239

(51) Int. Cl.
*B28B 17/02* (2006.01)
*B28C 7/02* (2006.01)
(Continued)

(52) U.S. Cl.
CPC .............. *B28B 17/026* (2013.01); *B28B 3/20* (2013.01); *B28B 17/0081* (2013.01); *B28C 3/00* (2013.01);
(Continued)

(58) Field of Classification Search
CPC ...... B28B 17/026; B28B 3/20; B28B 17/0081; B28C 3/00; B28C 9/002; B28C 7/0418;
(Continued)

(56) References Cited

U.S. PATENT DOCUMENTS

| | | | | |
|---|---|---|---|---|
| 6,113,829 A | * | 9/2000 | Bookbinder | B28B 3/269 264/177.11 |
| 2004/0217524 A1 | * | 11/2004 | Morris | B22F 3/22 264/639 |

(Continued)

FOREIGN PATENT DOCUMENTS

| | | |
|---|---|---|
| EP | 1 844 918 A1 | 10/2007 |
| JP | 2003-516880 A | 5/2003 |

(Continued)

OTHER PUBLICATIONS

U.S. Appl. No. 15/080,853, filed Mar. 25, 2016, Tajima et al.
(Continued)

*Primary Examiner* — Michael N Orlando
*Assistant Examiner* — Cynthia L Schaller
(74) *Attorney, Agent, or Firm* — Burr & Brown, PLLC

(57) ABSTRACT

A manufacturing method includes: a dry mixing step of dry mixing a raw material by batch processing; a wet mixing step of adding liquid to a dry mixture obtained at the dry mixing step, the liquid including at least one type of water, surfactant, lubricant and plasticizer, while wet mixing; a kneading step of kneading a wet mixture obtained at the wet mixing step; and a forming step of extruding a kneaded mixture (forming raw material) obtained at the kneading step to make a ceramic formed body. In the kneading step, the liquid is further added during kneading of the wet mixture.

3 Claims, 2 Drawing Sheets

(51) Int. Cl.
   *B28C 7/04* (2006.01)
   *B28B 17/00* (2006.01)
   *C04B 35/626* (2006.01)
   *C04B 38/00* (2006.01)
   *B28B 3/20* (2006.01)
   *B28C 9/00* (2006.01)
   *B28C 3/00* (2006.01)
   *G01B 11/24* (2006.01)

(52) U.S. Cl.
   CPC .......... *B28C 7/026* (2013.01); *B28C 7/0418* (2013.01); *B28C 9/002* (2013.01); *C04B 35/62625* (2013.01); *C04B 35/62635* (2013.01); *C04B 38/0009* (2013.01); *C04B 2235/6021* (2013.01); *G01B 11/24* (2013.01)

(58) Field of Classification Search
   CPC .............. B28C 7/026; C04B 38/0009; C04B 35/62635; C04B 35/62625; C04B 2235/6021; G01B 11/24
   See application file for complete search history.

(56) References Cited

U.S. PATENT DOCUMENTS

| | | |
|---|---|---|
| 2006/0257620 A1 | 11/2006 | Noguchi et al. |
| 2007/0243283 A1 | 10/2007 | Yamamura et al. |
| 2008/0211127 A1* | 9/2008 | Naruse .................... B28B 13/02 264/45.1 |
| 2009/0134545 A1 | 5/2009 | Signorini et al. |
| 2009/0218720 A1 | 9/2009 | Chen et al. |
| 2011/0049741 A1 | 3/2011 | Brown et al. |
| 2011/0236625 A1* | 9/2011 | Kikuchi ............. B01D 53/9413 428/116 |
| 2012/0049419 A1 | 3/2012 | Eicher et al. |
| 2012/0126444 A1 | 5/2012 | Yamamura et al. |
| 2012/0133065 A1 | 5/2012 | Caffrey et al. |

FOREIGN PATENT DOCUMENTS

| | | |
|---|---|---|
| JP | 2009-517251 A | 4/2009 |
| JP | 2013-545641 A | 12/2013 |
| WO | 2005/018893 A1 | 3/2005 |

OTHER PUBLICATIONS

Extended European Search Report, European Application No. 16162382.2, dated Aug. 5, 2016 (10 pages).

Starrett, et al. "Profile360 for Ceramic Extrusion Manufacturing Your Measurement Solution for Ceramic Extrusion Manufacturing Laser Measurement Solutions," dated Jan. 31, 2013, Retrieved from the Internet: URL: http://www.starrett.com/docs/other-downloadable-resources/2526---profile360-for-ceramic-extrusion-manufacturing-(lo-res).pdf?sfvrsn=11, retrieved on Jul. 27, 2016 (1 page).

"Developments in Stack-Mold Tooling Now Increase Large-Part Productivity," Modern Plastics International, McGraw-Hill, Inc., Lausanne, CH, vol. 10, No. 12, dated Dec. 1, 1980 (2 pages).

Japanese Office Action (with English translation), Japanese Application No. 2016-001239, dated Jul. 3, 2018 (7 pages).

European Office Action, European Application No. 16162382.2, dated Jul. 11, 2018 (8 pages).

* cited by examiner

METHOD FOR MANUFACTURING CERAMIC FORMED BODY, AND APPARATUS FOR MANUFACTURING CERAMIC FORMED BODY

The present application is an application based on JP 2015-074107 filed on Mar. 31, 2015 and JP 2016-001239 filed on Jan. 6, 2016 with the Japan Patent Office, the entire contents of which are incorporated herein by reference.

BACKGROUND OF THE INVENTION

Field of the Invention

The present invention relates to methods for manufacturing a ceramic formed body, and apparatuses for manufacturing a ceramic formed body.

Description of the Related Art

Conventionally a ceramic formed body, which is configured as a honeycomb structure having a honeycomb shape, for example, has been used for a wide range of purposes, including a catalyst carrier to purify exhaust gas from automobile, a filter to remove diesel particulates, or a heat storage member for combustion devices. A ceramic formed body is manufactured by extrusion of a forming raw material, followed by a firing step to fire it at a high temperature. A honeycomb structure as one form of the ceramic formed body has a lattice-shaped partition wall that defines a plurality of polygonal cells extending from one end face to the other end face and forming a through channel of fluid.

A forming step to extrude a ceramic formed body into a desired shape is performed using an extrusion machine having an extrusion port to which an extrusion die of a desired shape is attached, so as to extrude a forming raw material from the extrusion die with a predetermined extrusion pressure and at extrusion speed while keeping a horizontal extrusion direction.

For the forming raw material, various types of ceramic raw materials and binders, for example, are used, which are mainly in a powder form or a fine particle form. Then in order to allow such a material to be extruded from the extrusion machine, liquid such as water and/or surfactant is added at the mixing step to mix the ceramic raw materials or the like. This mixing step is typically performed using a batch-type mixer (batch mixer) firstly to dry-mix two types or more of aggregate particle raw materials including the ceramic raw materials as stated above that are weighed based on the predetermined mixture ratio (first mixing), to which liquid (water) is added for wet mixing (second mixing), whereby wet mixture (formulation for forming) is obtained (see Patent Document 1). Thereafter, the wet mixture (formulation for forming) prepared by wet mixing is kneaded at a kneading step, and then a forming raw material having predetermined viscosity that is adjusted suitably for extrusion is extruded from an extrusion machine.

[Patent Document 1] WO2005/018893

SUMMARY OF THE INVENTION

Note here that the viscosity of a forming raw material is affected by the amount of liquid added to the forming raw material. Therefore, the viscosity (fluidity, shape-retaining property) of the forming raw material extruded by the extrusion machine varies with the amount of liquid added at the mixing step, which greatly affects the mechanical load (torque) of the extrusion machine or the shape of the ceramic formed body after extrusion. That is, the viscosity of the forming raw material immediately before extrusion by the extrusion machine will greatly affect the production efficiency for extrusion (forming speed) of the final ceramic formed body or the shape of the product (e.g., roundness). Therefore in order to stabilize extrusion behavior of a ceramic formed body by an extrusion machine, the additive ratio of liquid to a forming raw material has to be kept at an appropriate level for balancing between the fluidity and the shape-retaining property so as to stabilize the viscosity of the forming raw material.

Additionally in order to improve the production efficiency for extrusion of a ceramic formed body by an extrusion machine, torque during extrusion by the extrusion machine has to be kept low. To this end, the additive ratio of liquid to the forming raw material is set high. However, when the forming raw material is prepared by wet mixing, if liquid of appropriate amount or more is added at one time, then the raw materials will not be mixed uniformly, meaning the difficulty to prepare a homogeneous forming raw material. It is then difficult to increase the additive ratio of liquid to a forming raw material, and so the torque during extrusion may increase and the production efficiency for extrusion may be lowered.

In view of such conventional circumstances, the present invention aims to provide a method for manufacturing a ceramic formed body enabling the manufacturing of a ceramic formed body having a controlled product shape, such as roundness, by keeping the torque applied to the extrusion machine stable and low, using a forming raw material having well-balanced fluidity and shape-retaining property, and to provide an apparatus for manufacturing a ceramic formed body to implement such a manufacturing method.

According to the present invention, the following method for manufacturing a ceramic formed body and an apparatus for manufacturing a ceramic formed body are provided.

According to a first aspect of the present invention, a method for manufacturing a ceramic formed body is provided, including: a dry mixing step of dry mixing a raw material to make the ceramic formed body by batch processing; a wet mixing step of adding liquid to a dry mixture obtained at the dry mixing step, the liquid including at least one type of water, surfactant, lubricant and plasticizer, while wet mixing; a kneading step of kneading a wet mixture obtained at the wet mixing step; and a forming step of extruding a forming raw material obtained at the kneading step, wherein in the kneading step, the liquid is further added during kneading of the wet mixture.

According to a second aspect of the present invention, the method for manufacturing a ceramic formed body according to the first aspect is provided, wherein an amount of the liquid added at the wet mixing step is 60 to 90 mass % with respect to a total additive amount of the liquid added at the wet mixing step and the kneading step.

According to a third aspect of the present invention, the method for manufacturing a ceramic formed body according to the first or second aspects is provided, further including a formed body shape measuring step of measuring a shape of the ceramic formed body made by the forming step immediately after extrusion, wherein the amount of the liquid added at any one of the wet mixing step and the kneading step is adjusted based on the shape of the formed body measured.

According to a fourth aspect of the present invention the method for manufacturing a ceramic formed body according to any one of the first to third aspects is provided, wherein the kneading step and the forming step are performed continuously and integrally.

According to a fifth aspect of the present invention, a ceramic formed body manufacturing apparatus is provided, including: a dry mixing unit that dry mixes a raw material to make a ceramic formed body by batch processing; a wet mixing unit that adds liquid to a dry mixture mixed by the dry mixing unit, the liquid including at least one type of water, surfactant, lubricant and plasticizer, and performs wet mixing; a kneading unit that kneads a wet mixture mixed by the wet mixing unit; and an extrusion unit that extrudes a forming raw material kneaded by the kneading unit, wherein the kneading unit further adds the liquid during kneading of the wet mixture.

According to a sixth aspect of the present invention, the ceramic formed body manufacturing apparatus according to the fifth aspect is provided, wherein an amount of the liquid added by the wet mixing unit is 60 to 90 mass % with respect to a total additive amount of the liquid added by the wet mixing unit and the kneading unit.

According to a seventh aspect of the present invention, the ceramic formed body manufacturing apparatus according to the fifth or sixth aspects is provided, further including a formed body shape measuring unit that measures a shape of the ceramic formed body made by the extrusion unit immediately after extrusion, wherein the amount of the liquid added by any one of the wet mixing unit and the kneading unit is adjusted based on the shape of the formed body measured.

According to an eighth aspect of the present invention, the ceramic formed body manufacturing apparatus according to any one of the fifth to seventh aspects is provided, wherein the kneading unit and the extrusion unit are configured continuously and integrally.

According to the method for manufacturing a ceramic formed body of the present invention, liquid can be added to the dry mixture and the wet mixture at two steps including the wet mixing step and the kneading step. That is, liquid is added at two points, whereby a forming raw material that does not include a non-homogeneous portion formed at the wet mixing step and the kneading step can be prepared, and the viscosity of the forming raw material introduced to the extrusion machine can be made constant. Further such addition of liquid performed separately at two points can increase the additive ratio of liquid in the forming raw material, whereby torque applied to the extrusion machine can be made low, and the product shape of the ceramic formed body after extrusion, such as roundness, can be improved.

Especially the wet mixing step is performed by continuous processing, and the kneading step and the forming step are performed continuously and integrally, whereby a series of the processing from the wet mixing step to the forming step to extrude the ceramic formed body can be performed continuously and integrally. As a result, the ceramic formed body can be extruded continuously, and the ceramic formed body having a uniform shape can be obtained effectively.

Additionally, a shape of the ceramic formed body immediately after extrusion is measured, and the additive amount of liquid at any one of the wet mixing step and the kneading step can be adjusted based on the measurement result of the shape of the formed body. Thereby, the measurement result of the shape of the formed body can be quickly fed-back so as to reflect the measurement result on extrusion of the ceramic formed body that is continuously performed from the kneading step (or the wet mixing step). Especially the shape of the ceramic formed body can be finely adjusted while making the kneading step and the forming step operate continuously without stopping temporarily. Note here that the ceramic formed body manufacturing apparatus, to which the method for manufacturing a ceramic formed body as stated above is applied, has the advantageous effect from the manufacturing method.

DESCRIPTION OF THE PREFERRED EMBODIMENTS

Figure 1:
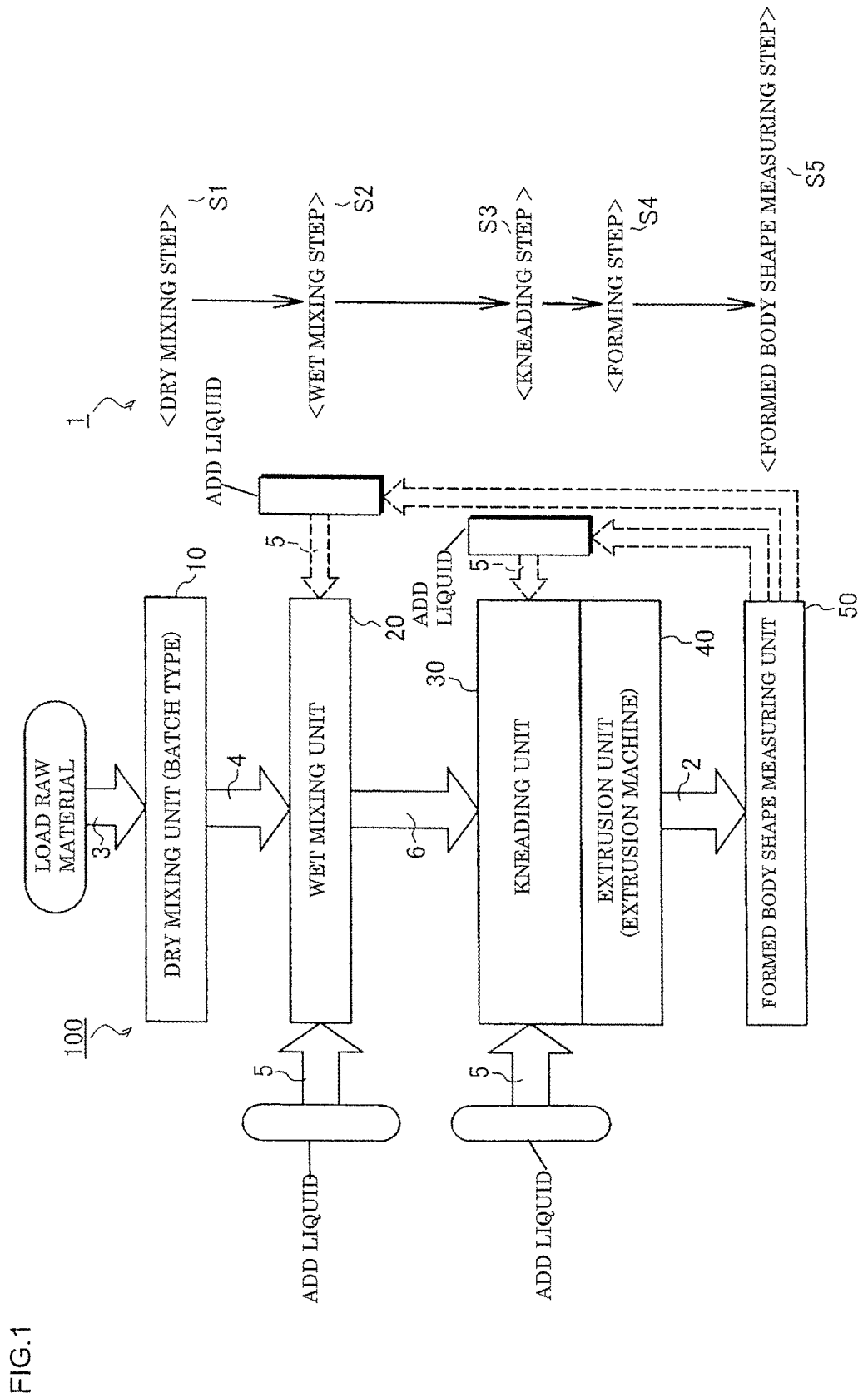
FIG. 1 schematically shows the configuration of a method for manufacturing a ceramic formed body and an apparatus for manufacturing a ceramic formed body that is one embodiment of the present invention.

The following describes embodiments of a method for manufacturing a ceramic formed body and an apparatus for manufacturing a ceramic formed body of the present invention. The present invention is not limited to the following embodiments, to which changes, modifications and improvements may be added without deviating from the scope of the invention.

As mainly shown in FIG. 1 and FIG. 2, a method for manufacturing a ceramic formed body of one embodiment of the present invention (hereinafter simply called a "manufacturing method 1") relates to extrusion processing especially to make a ceramic formed body 2, and mainly includes: a dry mixing step S1 to dry-mix a plurality of types of raw material 3 including a powder-form or a fine-particle form ceramic fine particles 3a and binder 3b; a wet mixing step S2 to add liquid 5 to the obtained dry mixture 4, while wet mixing by batch processing or continuous processing; a kneading step S3 to knead the obtained wet mixture 6; and a forming step S4 to extrude a forming raw material 8, which is prepared by degassng and consolidating the obtained kneaded mixture 7, using an extrusion machine, whereby a ceramic formed body 2 of a desired shape (e.g., a honeycomb structure having a honeycomb shape) is made. Herein, at the kneading step S3 in the manufacturing method 1 of the present embodiment, liquid 5 is added additionally during kneading of the wet mixture 6. That is, in the process to convert the raw material 3 into the forming raw material 8 (see FIG. 2), the liquid 5 can be added at each of the two steps of the wet mixing step S2 and the kneading step S3.

The manufacturing method 1 of the present embodiment further includes, in addition to the above configuration, a formed body shape measuring step S5 to measure the shape of the formed body of the ceramic formed body 2 immediately after extrusion, and the amount of the liquid 5 added at any one of the wet mixing step S2 and the kneading step S3 can be adjusted based on the shape of the formed body measured.

Figure 2:
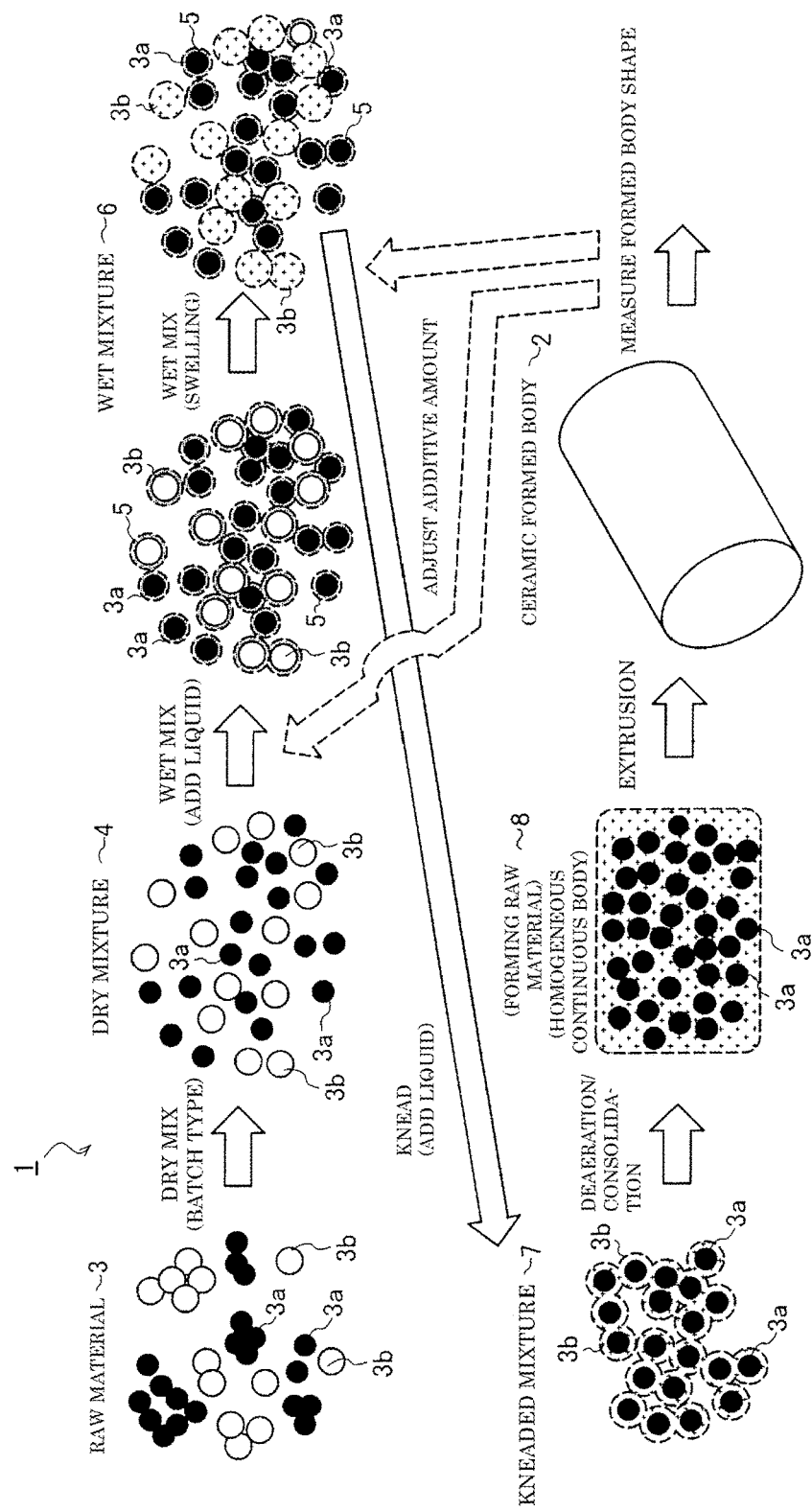
FIG. 2 schematically shows the flow of conversion process from a raw material into a forming raw material, and of making a ceramic formed body from the forming raw material.

The manufacturing method 1 of the present embodiment is implemented using a ceramic formed body manufacturing apparatus 100 having the configuration to implement each of the above-mentioned steps S1 to S5 that is schematically shown in FIG. 1. The ceramic formed body manufacturing apparatus 100 mainly includes a batch-type dry mixing unit 10, a batch-type or a continuous-type wet mixing unit 20, a kneading unit 30 and an extrusion unit 40 as their functional configuration, and the kneading unit 30 has, as its element, a function to further add the liquid 5. Additionally the ceramic formed body manufacturing apparatus 100 includes a formed body shape measuring unit 50 to measure the shape of the ceramic formed body 2 immediately after extrusion, and has a function to adjust the amount of the liquid 5 to be added at any one of the wet mixing unit 20 and the kneading unit 30 based on the shape of the formed body measured. The following describes the flow of the manufacturing method 1 of the present embodiment, as well as the configuration of each part of the ceramic formed body manufacturing apparatus 100 as stated above.

Herein, the extrusion unit 40 corresponds to a well-known extrusion machine that has been conventionally used for extrusion of the ceramic formed body 2. The liquid 5 added is not limited especially, which may be water, surfactant, lubricant or plasticizer alone or the one including at least one type of them. The liquid 5 is mixed or kneaded to each of the raw materials 3, whereby the forming raw material 8 as a homogeneous continuous body having viscosity suitable for extrusion from the extrusion unit 40 can be obtained.

The dry mixing step S1 is performed using the batch-type dry mixing unit 10 (batch mixer). The raw materials 3 including a plurality of types of powder form or fine-particle form ceramic fine particles 3a and binder 3b that are weighed at a predetermined mixture ratio is loaded into the dry mixing unit 10, and mixing by stirring is performed by a stirring mechanism (not illustrated) so that the ceramic fine particles 3a and the binder 3b can be mixed mutually uniformly. Thereby, the raw materials 3 are converted into the dry mixture 4 in which the plurality of types of ceramic fine particles 3a or the like are dispersed uniformly (see FIG. 2).

The obtained dry mixture 4 is sent to the wet mixing step S2. Herein the wet mixing step S2 is performed using the batch type or continuous type wet mixing unit 20 (batch mixer or continuous mixer) to perform wet mixing of the dry mixture 4 by batch processing or continuous processing. When the batch-type wet mixing unit 20 is used, the dry mixing unit 10 used for the dry mixing can be used directly. That is, after loading the liquid 5 of a prescribed additive amount, the dry mixture 4 and the liquid 5 are mixed using the above-mentioned stirring mechanism.

When the continuous-type wet mixing unit 20 is used, the dry mixture 4 mixed by the dry mixing unit 10 is gradually loaded into the wet mixing unit 20 in accordance with a prescribed loading ratio, to which the liquid 5 is loaded that is loaded at the same time, while wet mixing by a stirring mechanism (not illustrated). Thereby, the dry mixture 4 and the liquid 5 are converted into the wet mixture 6, in which they are dispersed uniformly and mixed.

In the manufacturing method 1 and the ceramic formed body manufacturing apparatus 100 of the present embodiment, the additive amount of the liquid 5 at the wet mixing step S2 (wet mixing unit 20) is set within the range of 60 to 90 mass % with respect to the total additive amount of the liquid 5 including the additive amount of the liquid 5 as well that is added at the kneading step S3 (kneading unit 30) described later.

At the wet mixing step S2, when the liquid 5 is added to the dry mixture 4, followed by mixing by stirring, then the liquid 5 is firstly adsorbed to the surface of each of the ceramic fine particles 3a and the binder 3b. Then, when this wet mixing is continued, the binder 3b in the raw material 3 absorbs the liquid 5 and swells (see FIG. 2). Thereby, the dry mixture 4 is converted into the wet mixture 6. On the contrary, the ceramic fine particles 3a do not swell even when they absorb the liquid 5.

Subsequently, the kneading step S3 is performed using the kneading unit 30 (kneader). In the manufacturing method 1 of the present embodiment, the kneading step S3 and the subsequent forming step S4 are performed continuously and integrally. That is, in the ceramic formed body manufacturing apparatus 100, the wet mixture 6 sent from the wet mixing unit 20 is kneaded by the kneading unit 30, and the processed kneaded mixture 7 (forming raw material 8) is directly sent out to the extrusion unit 40 that is configured continuously and integrally with the kneading unit 30. Then, the forming raw material 8 is extruded through the extrusion die of the extrusion unit 40. Thereby, the ceramic formed body 2 is made (see FIG. 2).

At the kneading step S3, the binder 3b swelling at the wet mixing step S2 is compatibilized with the ceramic fine particles 3a. As a result, the surface of the ceramic fine particles 3a becomes coated with the swelling binder 3b (see FIG. 2). Thereby, the wet mixture 6 is converted into the kneaded mixture 7. Herein, the obtained kneaded mixture 7 undergoes degassing processing in the kneading unit 30 to suck the air included in the kneaded mixture 7 using a vacuum suction device for degassing, and then consolidation processing is performed to the kneaded mixture 7 to apply predetermined load to the kneaded mixture 7 so as to compress the kneaded mixture for densification (see FIG. 2). As a result, the forming raw material 8 as a densified homogeneous continuous body to be loaded in the extrusion unit 40, in which the ceramic fine particles 3a and the binder 3b are mixed uniformly, can be made.

When the continuous-type wet mixing unit 20 is used, the processing to the extrusion unit 40 via the kneading unit 30 can be performed continuously and integrally. Therefore, the ceramic formed body 2 can be made more effectively and stably. In the case where the batch-type wet mixing unit 20 is used as well, the sufficient effect from the manufacturing method 1 of the present invention can be obtained.

In the manufacturing method 1 of the present embodiment, at the kneading step S3, the liquid 5 can be further added during kneading of the wet mixture 6. That is, in the process to convert the raw material 3 into the forming raw material 8, there are two chances to add the liquid 5.

Herein, in the manufacturing method 1 and the ceramic formed body manufacturing apparatus 100 of the present embodiment, the additive amount of the liquid 5 added at the kneading step S3 is set within the range of 10 to 40 mass % with respect to the total additive amount as stated above. This additive amount of the liquid 5 corresponds to the additive amount of the liquid 5 that is added at the wet mixing step S2 (wet mixing unit 20) as stated above.

The forming raw material 8 prepared through degassing and consolidation of the kneaded mixture 7 is sent to the extrusion unit 40 (extrusion machine), where the forming raw material is extruded with a predetermined extrusion pressure and at such extrusion speed (forming step S4). Herein, since the configuration of the extrusion machine corresponding to the extrusion unit 40 is well known, the detailed descriptions thereof are omitted.

Subsequently, the shape of the ceramic formed body 2 immediately after extrusion through the die is measured (formed body shape measuring step S5). Herein, the formed body shape measuring step S5 can be performed using a well-known shape measurement technique, for example, this can be performed using a contactless-type formed body shape measuring unit 50 including a well-known laser measurement unit. Thereby, data on the shape of the ceramic formed body 2 immediately after extrusion can be obtained. From the measurement result of the shape of the formed body based on the obtained data on the shape, deviation from a standard shape is detected, and a prescribed amount of the liquid 5 is added to the forming raw material 8 based on the magnitude of the deviation, for example, so as to adjust the additive amount of the liquid 5 (see the dotted-line arrows in FIG. 1).

Herein, such addition of the liquid 5 based on the measurement of the formed body shape is performed at any one of the wet mixing step S2 (wet mixing unit 20) and the kneading step S3 (kneading unit 30). That is, at any one of the wet mixing step S2 and the kneading step S3, the additive amount of the liquid 5 that is added to formulate the forming raw material 8 is made constant, and then the additive amount is adjusted with a predetermined ratio with respect to such an additive amount of the liquid 5. Especially the additive amount of the liquid 5 is preferably adjusted at the kneading step S3 immediately before the extrusion. That is, the additive amount of the liquid 5 at the wet mixing step S2 may be made constant, and then the liquid 5 may be added with a predetermined ratio with respect to the additive amount of the liquid 5.

When the additive ratio of the liquid in the forming raw material 8 is determined as high based on the measured shape of the formed body, the additive amount of the liquid 5 at the wet mixing step S2 or the kneading step S3 is adjusted so as to decrease from the prescribed additive amount, for example. On the contrary, when the additive ratio of the liquid in the forming raw material 8 is determined as low based on the measured shape of the formed body, the additive amount of the liquid 5 at the wet mixing step S2 or the kneading step S3 is adjusted so as to increase from the prescribed additive amount, for example. Note here that, such determination to increase or decrease the additive amount of the liquid 5 based on the formed body shape is made considering the influences from the ambient environment, such as temperatures and humidity, as well as based on some empirical values.

As described above, according to the manufacturing method 1 of the present embodiment, the liquid 5 can be added to the dry mixture 4 and the wet mixture 6 at the two steps or at the two configurations of the wet mixing step S2 (wet mixing unit 20) and the kneading step S3 (kneading unit 30), whereby the forming raw material 8 extruded can be homogeneous and have a high additive ratio of the liquid. As a result, an increase in torque applied to the extrusion machine during extrusion can be suppressed, and the ceramic formed body 2 can be manufactured while keeping the fluidity of the forming raw material 8 and the shape-retaining property of the ceramic formed body 2, and the product shape of the ceramic formed body 2, such as the roundness, becomes stable.

Additionally, the wet mixing step S2 is performed by continuous processing, in other words, a continuous-type mixer is used as the wet mixing unit 20, whereby the process from the wet mixing step S2 to the forming step S4 via the kneading step S3 can be performed continuously and integrally. That is, the process can be performed without interruption from the wet mixing step S2 to the forming step S4, and so the ceramic formed body 2 can be manufactured effectively.

Further, the shape of the ceramic formed body 2 immediately after extrusion is measured, and the measurement result of the shape of the ceramic formed body 2 is fed back to control the viscosity of the forming raw material 8 in a certain range. Thereby, torque during extrusion can be kept more stable and suppressed lower, and the shape of the formed body can be stabilized. Especially since the kneading step S3 and the forming step S4 are performed continuously and integrally, the shape of the ceramic formed body can be controlled to be constant while making the ceramic formed body manufacturing apparatus 100 operate continuously without stopping temporarily.

Examples

The following describes a method for manufacturing a ceramic formed body and an apparatus for manufacturing a ceramic formed body of the present invention by way of the following examples, and the method for manufacturing a ceramic formed body and the apparatus for manufacturing a ceramic formed body of the present invention are not limited to these embodiments.

(1) Making a Honeycomb Structure (Ceramic Formed Body)

A honeycomb structure as one type of a ceramic formed body was made by the method for manufacturing a ceramic formed body and using the apparatus for manufacturing a ceramic formed body of the present invention (Examples 1 to 5 and Comparative Examples 1 to 4). The honeycomb structures of Examples 1 to 5 and Comparative Examples 1 to 4 were manufactured while changing the types of the wet mixing unit (batch-type or continuous-type) and the conditions concerning the additive ratio of liquid at the wet mixing step and the kneading step, and the other conditions were the same. These honeycomb structures had a round-pillar shape, in which a large number of polygonal cells were defined by a lattice-shaped partition wall, and the thickness of the partition wall was 100 μm, the cell shape was hexagonal, the cell density was 600 cpsi (cells per square inch) (93.0 cells/cm$^2$), the honeycomb diameter was 100 mm, and the honeycomb length was 100 mm. The following Table 1 shows the condition to make the honeycomb structures, the additive ratios of liquid at the wet mixing step and the kneading step, and their evaluation results.

TABLE 1

| | Dry mixing unit | Wet mixing unit | Kneading unit | Additive ratio of liquid | | Evaluation results | | |
| | | | | Wet mixture step/% | Kneading step/% | Variation range of supplied amount/% | Extrusion torque/% | Roundness/mm |
|---|---|---|---|---|---|---|---|---|
| Ex. 1 | batch | batch | continuous | 90 | 10 | 2.1 | 61 | 1.7 |
| Ex. 2 | batch | batch | continuous | 70 | 30 | 1.9 | 63 | 1.6 |
| Ex. 3 | batch | batch | continuous | 60 | 40 | 1.6 | 69 | 1.5 |
| Ex. 4 | batch | continuous | continuous | 90 | 10 | 1.2 | 62 | 1.2 |
| Ex. 5 | batch | continuous | continuous | 60 | 40 | 1.1 | 67 | 1.1 |
| Comp. Ex. 1 | batch | batch | continuous | 95 | 5 | 3 | 61 | 3.3 |
| Comp. Ex. 2 | batch | batch | continuous | 50 | 50 | 1.5 | 87 | 1.5 |

TABLE 1-continued

|  | Dry mixing unit | Wet mixing unit | Kneading unit | Additive ratio of liquid | | Evaluation results | | |
|---|---|---|---|---|---|---|---|---|
|  |  |  |  | Wet mixture step/% | Kneading step/% | Variation range of supplied amount/% | Extrusion torque/% | Roundness/ mm |
| Comp. Ex. 3 | batch | continuous | continuous | 50 | 50 | 0.9 | 86 | 1 |
| Comp. Ex. 4 | batch | batch | continuous | 100 | 0 | 3.2 | 62 | 2.5 |

(2) Relationship Between Additive Ratio of Liquid and Variation Range of Supplied Amount As shown in Table 1, the variation range of supplied amount was 2.1% or less for all of Examples 1 to 5, and so it was confirmed that the supplied amount of the forming raw material during extrusion did not vary greatly. That is, it showed that the forming raw material was supplied stably to the extrusion unit. Therefore no factors to vary the shape of the formed body greatly were found, and it was considered that extrusion was performed favorably.

Especially as shown in Examples 1 to 3, when the batch-type wet mixing unit was used at the wet mixing step, as the additive ratio of liquid at the kneading step increased with respect to the total additive amount of liquid (10 to 40 mass %), the variation range of supplied amount decreased (see Table 1). That is, fluidity of the forming raw material was improved by adding liquid at the kneading step. On the contrary, as shown in Comparative Example 1 or Comparative Example 4, when the additive ratio of liquid at the kneading step was as low as 5 mass % with respect to the total additive amount of liquid, the variation range of supplied amount was as large as 3% or more, and so the shape of the formed body varied and desired roundness was not obtained. That is, this shows that, when liquid was added at the two steps of the wet mixing step (batch processing) and the kneading step, a predetermined ratio or more (at least 10 mass % or more) of the liquid added at the kneading step could improve the fluidity of the forming raw material. On the contrary, if the additive ratio of liquid at the kneading step was more (50 mass % or more) with respect to the total additive amount, although the variation range of supplied amount was suppressed to be 2.1% or less, the value of extrusion torque was high (the details are described later), and so it was difficult to perform stable extrusion. Therefore, the additive ratio of liquid at the kneading step was the range of 10 to 40 mass % suitably. Similarly, as shown in Examples 4 and 5, when the continuous-type wet mixing unit was used at the wet mixing step as well, the suitable range of the additive ratio of liquid at the kneading step was 10 to 40 mass %.

(3) Relationship Between Additive Ratio of Liquid and Extrusion Torque

As shown in Table 1, the value of extrusion torque was around 60 to 70% in all of Examples 1 to 3 and Comparative Example 1, and in this case, excessive load was not applied presumably to the extrusion machine. On the contrary, the value of extrusion torque in Comparative Example 2 was 87% and the value of extrusion torque in Comparative Example 3 was 86%, which were higher than those of Examples 1 to 3 and Comparative Examples 1 as stated above. In Comparative Example 2, the additive ratio of liquid at the wet mixing step and at the kneading step was 50%. In this case, although the value of the variation range of supplied amount shown in the above (2) was small and so the forming raw material was supplied stably, the value of extrusion torque was too high, meaning that load to the extrusion unit (extrusion machine) was large, and adverse effects on the production efficiency for extrusion and the forming speed of the honeycomb structure were found. This showed that, when the wet mixing step of any one of batch processing and continuous processing was used, at least 60% of liquid has to be added at the wet mixing step.

(4) Relationship Between Additive Ratio of Liquid and Roundness

Roundness is an index to represent a difference (deviation) from a round-shaped geometric circle, which typically is a difference in radii between two geometric circles that are concentrically arranged so as to enclose the measurement target when the distance between the two circles is the minimum, and indicated with a difference between the maximum diameter and the minimum diameter. In these Examples, an existing roundness measurement instrument was used so as to measure the maximum diameter and the minimum diameter at the both ends face of a honeycomb structure with a vernier caliper, and the difference thereof was obtained.

According to this, roundness was 1.8 mm or less for all of Examples 1 to 5, and so they had favorable roundness. It was confirmed that viscosity of the forming raw material was stable in the manufacturing method and the ceramic formed body manufacturing apparatus of the present embodiment including two steps of adding liquid to the forming raw material, and that the effect from adding liquid twice was effective. On the contrary, as shown in Comparative Example 1, when the value of the variation range of supplied amount was as large as 3% or more, this greatly affected the roundness of the honeycomb structure made by extrusion, and the roundness tended to exceed 1.8 mm. That is, the roundness increased with the value of the variation range of supplied amount, and so it was difficult to manufacture a honeycomb structure having a stable product shape.

As shown in Examples 1 to 5 as stated above, according to the method for manufacturing a ceramic formed body and the apparatus for manufacturing a ceramic formed body of the present invention, liquid is added at the wet mixing step and the kneading step. Thereby, especially at the wet mixing step performing batch processing, the viscosity of the forming raw material is kept constant. As a result, the shape of the ceramic formed body after extrusion is stable.

The method for manufacturing a ceramic formed body and the apparatus for manufacturing a ceramic formed body of the present invention can be used to manufacture a ceramic formed body for a catalyst carrier to purify exhaust gas from automobile, a filter to remove diesel particulates, or a heat storage member for combustion devices.

DESCRIPTION OF REFERENCE NUMERALS

1: manufacturing method (method for manufacturing a ceramic formed body), 2: ceramic formed body, 3: raw material, 3a: ceramic fine particles, 3b: binder, 4: dry mixture, 5: liquid, 6: wet mixture, 7: kneaded mixture, 8: forming raw material, 10: dry mixing unit, 20: wet mixing unit, 30: kneading unit, 40: extrusion unit, 50: formed body shape measuring unit, 100: ceramic formed body manufacturing apparatus, S1: dry mixing step, S2: wet mixing step, S3: kneading step, S4: forming step, S5: formed body shape measuring step.

What is claimed is:

1. A method for manufacturing a ceramic formed body, comprising:
    a dry mixing step of dry mixing a raw material to make the ceramic formed body by batch processing;
    a wet mixing step of adding liquid to a dry mixture obtained at the dry mixing step, the liquid including at least one type of water, surfactant, lubricant and plasticizer, while wet mixing;
    a kneading step of kneading a wet mixture obtained at the wet mixing step; and
    a forming step of extruding a forming raw material obtained at the kneading step,
    wherein in the kneading step, the liquid is further added during kneading of the wet mixture, and
    wherein an amount of the liquid added at the wet mixing step is 60 to 90 mass % with respect to a total additive amount of the liquid added at the wet mixing step and the kneading step.

2. The method for manufacturing a ceramic formed body according to claim 1, further comprising a formed body shape measuring step of measuring a shape of the ceramic formed body made by the forming step immediately after extrusion, wherein
    the amount of the liquid added at any one of the wet mixing step and the kneading step is adjusted based on the shape of the formed body measured.

3. The method for manufacturing a ceramic formed body according to claim 1, wherein the kneading step and the forming step are performed continuously and integrally.

* * * * *